March 29, 1960 R. J. SULLIVAN 2,930,305
CASSETTE
Filed Jan. 31, 1956 2 Sheets-Sheet 1
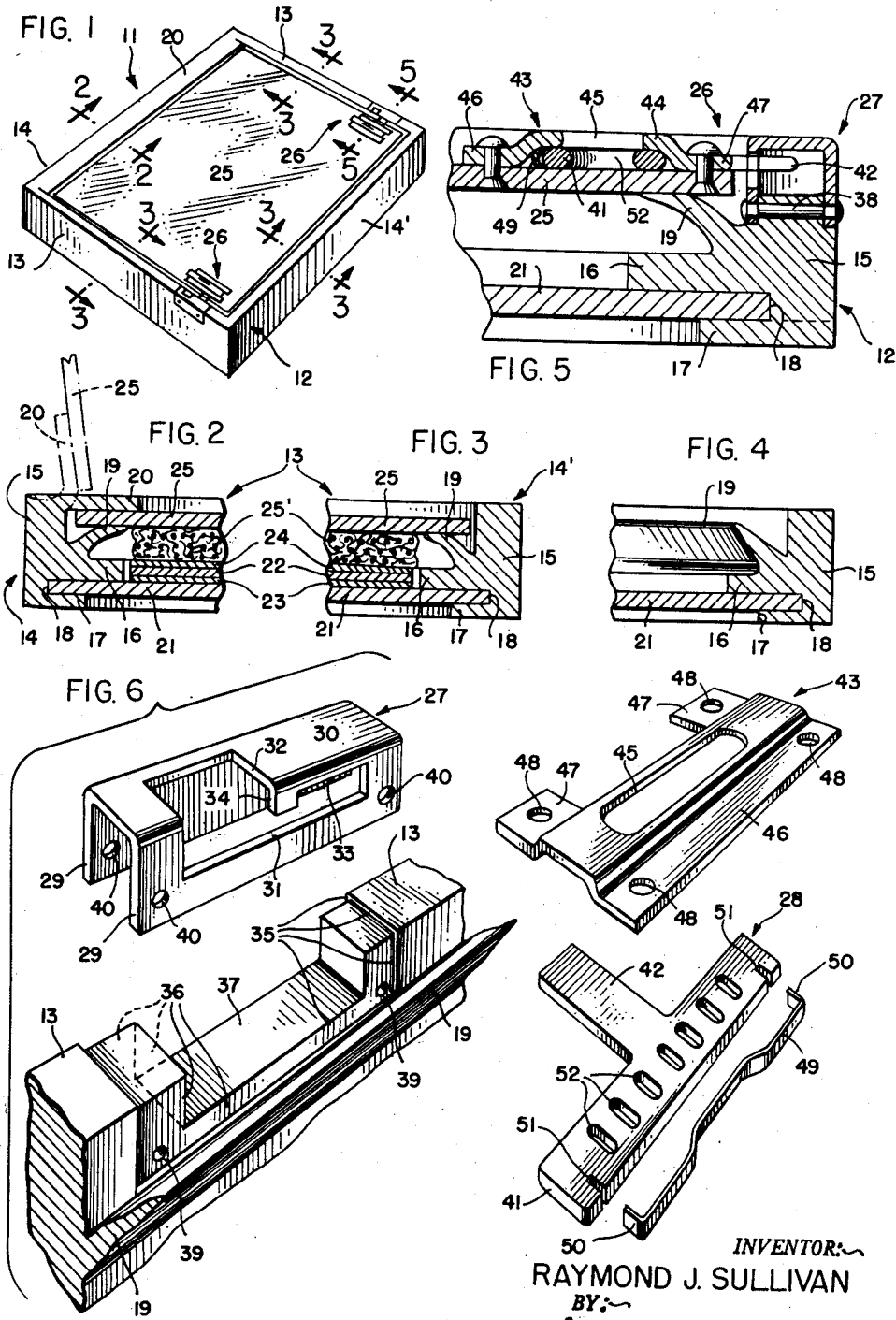
INVENTOR:
RAYMOND J. SULLIVAN
BY:
Junius F. Cook, Jr.
ATTORNEY

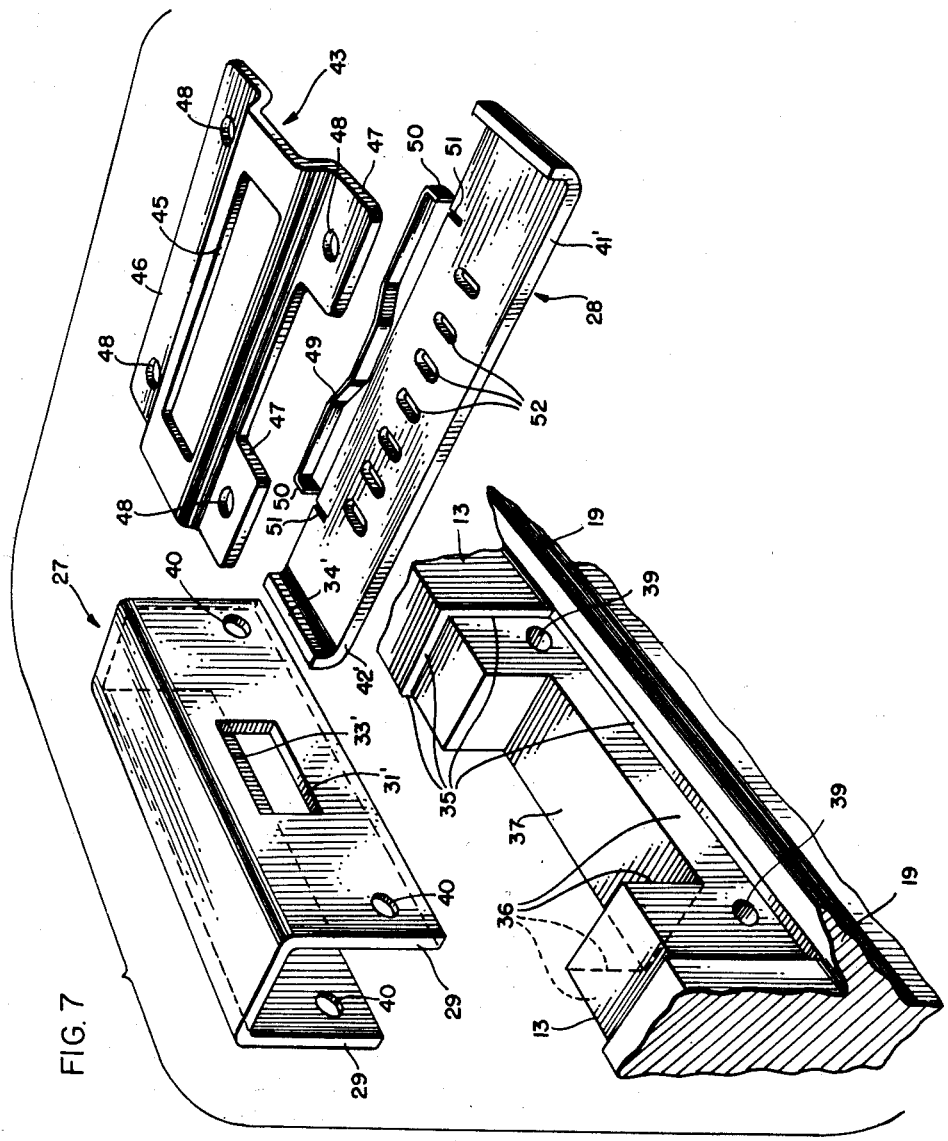

United States Patent Office 2,930,305
Patented Mar. 29, 1960

2,930,305

CASSETTE

Raymond J. Sullivan, Milwaukee, Wis., assignor to General Electric Company, a corporation of New York Application January 31, 1956, Serial No. 562,404

1 Claim. (Cl. 95—71)

The present invention relates, in general, to holding frames for photosensitive sheet material, and has more particular reference to cassettes for enclosing and supporting sheet material in position for exposure to rays to which the material is sensitive, the invention pertaining especially to cassettes for use in radiography or X-ray photography. The invention, however, is not necessarily restricted to radiographic cassettes, many of its aspects being well suited for incorporation in frames for holding material in position for exposure to visible light, or to rays other than X-rays.

Cassettes for supporting sensitive sheet material serve to hold the supported material firmly in predetermined position for receiving a picture image latently carried by an impinging ray, so that the image may be recorded on the cassette supported sheet. For this reason, cassettes are commonly of rigid construction, usually comprising frames of steel, wood, or other relatively strong, rigid and self supporting material, in order to incorporate requisite rigidity in the cassette structure. As a consequence of the need for rigidity, cassettes of the sort heretofore provided have been relatively costly and also relatively heavy structures, although lightness is an exceedingly desirable characteristic in cassettes, especially where used in apparatus designed to move the cassette rapidly from inactive or standby position, into a projected picturing position or positions, as in so called "spot film" structures of the sort shown in U.S. Letters Patent No. 2,277,330, of March 24, 1942, covering the inventions of Arthur J. Kizaur in Plate Changer Mechanism.

An important object of the present invention, therefore, is to provide an exceedingly lightweight holder or cassette which is, withal, adequately rigid for the performance of its sheet supporting function; a further object being to provide a cassette of the character mentioned that is adapted for low cost manufacture.

Another important object of the invention resides in providing a cassette comprising a marginal or peripheral frame of light weight resilient material and rigid closure panels, also of preferably light weight material, secured on the frame in position to enclose sheet material within the frame and between the panels, the panels serving also to adequately rigidify the cassette structure.

Another important object of the invention is to provide a cassette for photosensitive sheet material comprising a marginal frame of relatively flexible material of rubber-like character, and to rigidify the same through the attachment thereto of closure panels of aluminum, fiber board, glass or other rigid material, that is transparent to rays of the sort to which cassette supported sheet material is sensitive, to thereby render the cassette capable of adequately supporting sensitive sheet material of flexible character firmly in position for exposure to rays to which the material is sensitive.

Another important object is to provide a cassette comprising a marginal frame provided with a resilient rubber-like flap on and extending at a side of the frame, and a panel secured at one edge to the flap in position to form a hinged enclosure for the back of the frame; a further object being to provide a panel of relatively rigid material secured at its edges on the frame in position to close the front thereof; a still further object being to provide inexpensive latch means for securing a movable back closure panel in closed position on the frame.

Another important object is to provide improved latch means for securing the movable back closure panel of a cassette in relatively closed position on a marginal cassette frame of resilient material; a further object being to provide latch means of the character mentioned comprising a keeper of relatively rigid material secured upon the resilient cassette frame in position to interfittingly receive the projecting latch portion of a bolt element shiftably mounted upon the movable back closure panel of the cassette; a further object being to utilize the resilience of the constituent material of the marginal frame to secure the latching portion of the bolt interlockingly in latching relationship with the keeper; a further object being to form the bolt and keeper as inexpensive sheet metal stampings, and to mount the bolt shiftably on the cassette closure panel by means of a preferably stamped sheet metal mounting bracket.

Another important object is to provide the shiftable bolt element with a bracket engaging spring tending to hold the bolt against shifting movement on the closure panel.

Briefly stated, the invention embodied in a cassette for photosensitive sheet material comprises a peripheral frame of resilient, flexible material, and a panel of rigid material closing the bottom of the frame and secured thereto in fashion rigidifying the same, said frame having an inwardly extending resilient flange forming a circumferential lip, inclined toward the back of the frame, in position to yieldingly engage the marginal edges of a back closure panel when the same is in closed position on the frame, in order to provide a light-tight seal with the closure panel at and around its marginal edges, and to resiliently urge or bias the panel away from closed position, the present invention including the provision of interfitting latch means on the frame and panel, to hold the panel in closed position against the resilient bias imparted thereto by said lip, said bias serving to lock said latch means in closed position, thereby requiring depression of the closure panel on said lip against said bias as a prerequisite to releasing and latching movement of the latch means on the closure panel.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings:

Fig. 1 is a perspective view of a cassette embodying the present invention and including a movable cassette cover shown in relatively closed position;

Figs. 2 and 3 are enlarged sectional views respectively taken substantially along the lines 2—2 and 3—3 of Fig. 1;

Fig. 4 is a sectional view similar to Fig. 3 showing the configuration of the illustrated cassette components when the cassette cover is open;

Fig. 5 is a greatly enlarged sectional view taken substantially along the line 5—5 in Fig. 1 to illustrate improved cassette cover latching means embodying the present invention;

Fig. 6 is an exploded view illustrating the components of the cover latching means shown in Fig. 5; and Fig. 7 is an exploded view showing the components of modified cover latching means embodying the invention.

To illustrate the invention, the drawings show a cassette or holder 11 for photosensitive sheet material. The cassette shown is particularly adapted for supporting photosensitive material in position for exposure to X-rays in making radiographic pictures, although the invention is not necessarily limited to cassettes for use in X-ray photography. Indeed, the several novel aspects of the invention may have useful application in frames for the support of material sensitive to visible light and to light rays within the ultra violet and infra red bands of the spectrum. Nevertheless, the present invention was conceived and developed more especially to provide an improved cassette structure for enclosing sensitive material of the sort used in making radiographic pictures by exposure of the material to X-rays latently carrying the picture to be recorded. X-ray sensitive material is sensitive also to visible light and, hence, of necessity, has to be stored in light tight containers and mounted in light excluding cassettes, before and after exposure of the material to X-rays, and until the material is chemically processed, after exposure, to permanently set the pictured image therein.

A cassette for supporting a sheet of photosensitive material in position for exposure to rays to which the material is sensitive, desirably should present the sheet, as nearly as possible, in absolutely flat condition in the cassette, it being also desirable to provide for mounting the sheet of material in the cassette either alone or together with one or more sheet-like intensifying screens, which may be disposed in position overlying either or both of the opposite faces of the photosensitive sheet within the cassette. Heretofore it has been customary to provide cassettes for photosensitive material comprising rigid peripheral frames containing a front panel and a removable back or closure panel for mounting the photosensitive sheet material, together with a resilient backing pad, and one or more intensifying screens, if desired, within the rigid frame and between the front and back panels, an example of such conventional cassette construction being disclosed in U.S. Letters Patent No. 2,340,378, which issued February 1, 1944, on the invention of Julius J. Grobe in Cassette Structure, wherein desired cassette rigidity is accomplished by means of front and back cover panels marginally supported within a peripheral frame of generally tubular, fabricated sheet metal construction, providing unusually rigid frame characteristics.

Conventional rigid cassette structures are relatively expensive to manufacture because of the high cost of fabricating a peripheral frame in fashion affording desired cassette rigidity. Furthermore, conventional cassettes having the degree of strength and rigidity heretofore considered essential, are relatively heavy structures. In conventional cassette structures, considerable difficulty is encountered in providing an effective light tight seal between the marginal edges of the removable back cover panel and the surrounding peripheral frame of the cassette.

The cassette 11 of the present invention comprises a peripheral frame forming rim 12 of resilient rubber-like material that is exceedingly light in weight as compared with wood, steel or other rigid materials of the sort heretofore used in the construction of cassette frames. The frame 12, as shown, may be and preferably is of rectangular configuration comprising spaced side members 13 and spaced apart members 14 and 14' interconnecting the opposite ends of the side members 13. The side and end members may comprise molded strips of flexible rubber-like material, sectionally configurated to provide a body portion 15 having a pair of spaced apart lateral flanges 16 and 17 extending therefrom at one end thereof, said flanges defining a groove 18 therebetween. The strip material may also include an integral inclined lip forming flange 19 formed on the strip at the junction of the flange 16 with the body portion 15, said flange extending in an inclined direction to substantially equally divide the right angle made by the flange 16 with the surface of the body portion 15 from which said flange projects. The lip forming flange 19 is preferably tapered from its strip connected base toward its free edge, and is inclined in a direction toward the end of the body portion 15 remote from the groove 18.

The strip forming the side 14 of the frame may also include a flange 20 formed integrally on the body portion 15 at the end thereof remote from the flanges 16 and 17, said flange 20 extending in parallel spaced apart relation with respect to the flanges 16 and 17 and being preferably of relatively thin flexible character, whereby the flange 20 may form a flexible flap, hingedly connected at its base, upon the body portion 15 of the strip, and extending thence adjacent the free edge of the lip forming flange 19 which projects from the base of the flange 16 upwardly toward the flange 20. The side walls 13 and the end wall 14' preferably omit the flange 20 entirely.

The opposite ends of the frame members 13, 14 and 14' may be mitered and sealingly connected in any suitable or preferred fashion, as by means of corner brackets, as of sheet metal, riveted or otherwise secured to the abutting corner forming ends of the frame members, or said frame members may be secured together by cementing, vulcanizing, or otherwise integrating the members, at the corners of the frame 12. When the members 13, 14 and 14' are so joined, the resulting frame 12 will provide a marginal seat comprising the grooves 18 of all of the frame forming members; and a front closure panel 21 may be mounted upon and secured in the frame by applying the peripheral edges of the panel in the marginal seat formed by the grooves 18 of the frame members. If desired, the flange 17 may be omitted and the edges of the front panel 21 may be cemented to the flange 16.

The panel 21 may comprise any suitable or preferred relatively rigid, self-supporting material which is substantially transparent to the rays to which the sheet material to be enclosed in the casette is sensitive. For radiographic purposes, the panel 21 may comprise any preferred synthetic plastic material that is opaque to visible light, or metal such as magnesium, aluminum, beryllium, or alloys thereof, or other material that is substantially transparent to X-rays, and substantially opaque to visible light. If, however, the cassette is to be used for mounting material for exposure to visible light rays, the panel 21 may be made of glass, fused quartz, or other material that is transparent to visible light. In such cases, however, the frame 12 may be provided with a readily removable shutter of material opaque to visible light on the body portion 15, in position overlying and normally covering the panel 21; and such shutter may be slidably mounted, at its edges, in grooves similar to and formed in the frame members outwardly of the grooves 18, so that the panel covering shutter may be readily removed to uncover the panel 21 for the exposure of sensitive material in the cassette to visible light rays therethrough.

By securing the flexible frame 15 upon the edges of a panel 21 of relatively rigid material, the frame itself may be sufficiently rigidified to allow it to function successfully as a cassette for flexible sheet material. It will be seen that the frame 15, together with the panel 21, forms a shallow container adapted to receive a flexible sheet of photosensitive material 22 required to be supported in the cassette, either alone or together with additional sheets of material 23 and 24, which may comprise intensifying screens of the sort commonly used in conjunction with X-ray sensitive material in the making of radiographs.

In addition to the frame 15 and panel 21, the cassette 11 may comprise a cover panel 25 for removably enclosing the back of the frame, in order to hold the sheet of material 22, either alone or together with the layers 23 and 24, in flat condition between the front panel 21 and the back cover panel 25. The cover panel 25 preferably comprises a flat plate of sheet metal, such as magnesium, aluminum, beryllium, or synthetic plastic, or other preferably rigid, self-supporting material, which is opaque to visible light and preferably transparent to penetrating rays, such as X-rays. On its inwardly facing surface, the panel 25 may carry a pressing pad 25' of resilient material for pressing the layers 22, 23 and 24 together and against the panel 21. The panel 25 preferably is of rectangular marginal configuration, the same being sized to fit snugly within the space defined by the body portions 15 of the interconnected frame members 13, 14 and 14'. Accordingly, when in closed position on the frame, the panel 25 may rest upon the free edge portions of the flanges 19 of the frame members, suitable means being provided for latching the member 25 in closed position, whereby the resilient wiping engagement of the flanges 19 forms an effective visible light seal around the marginal edges of the back cover panel 25.

The cover panel 25 may be hingedly connected on the frame member 14 in any suitable or preferred fashion. As shown, however, the panel 25 is hinged in the frame by cementing the flexible flange 20 of the member 14 to the panel along a side edge thereof. The back cover panel 25, accordingly, may be moved to the open position, shown in dotted lines in Fig. 2, merely by flexing the flange 20 along its line of junction with the body portion 15 of the frame member 14. The cover panel 25 may also be swung into closed position in the frame, with the marginal edges of the panel making a visible light seal with the flange means 19, thereby enclosing a sheet of photosensitive material 22 between the panels 21 and 25 and within the marginal frame 12.

In order to latch the cover panel 25 in closed position in the frame, the present invention contemplates the provision of a pair of latching devices 26, each comprising a keeper 27, said keepers being respectively mounted upon the opposite side frame members 13 adjacent the frame member 14' remote from the hinged side of the back panel 25. In addition to the keeper 27, each latching device may comprise a bolt element 28 shiftably secured upon the closure panel 25 in position to latchingly engage each with a cooperating keeper 27.

The keeper may comprise a preferably rectangular plate of sheet metal bent to provide a pair of spaced, parallel side walls 29 and a medial wall portion 30 interconnecting said side walls and maintaining the same in spaced apart relationship. As shown more especially in Fig. 6 of the drawings, one of said side walls 29 may be formed with a bolt receiving slot 31, connected at one end with a bolt receiving opening 32 formed in the medial wall 30, the other end of the slot 31 forming a bolt latching seat 33 defined in the edge of the slot 31 adjacent the medial wall 30, between one end of the slot remote from the opening 32, and a locking projection 34 disposed medially of the slot 31 in position defining one side of the opening 32.

The spacement of the outwardly facing surfaces of the side walls 29 is preferably equal to the width of the body portion 15 of the side frame members 13, the width of said side walls 29 being substantially equal to the depth of the body 15 between the flange 19 and the end of said body remote from the panel mounting slot 18. The opposite sides and end of the body 15, remote from the panel slot 18, may be recessed, as at 35, to form seats 36 for receiving the edge portions of the keeper 27, the material of the body 15 being cut away, as at 37, between the seats in registration with the slot 31 and opening 32.

The keepers 27 may be secured on the seats 36 in any suitable or preferred fashion, as by means of fastening pins 38 extending in openings 39 formed through the body portions 15 of the frame members 13, and registering openings 40 formed in the spaced side wall portions 29 of the keepers, the opposite ends of the pins 38 being riveted, peened, or otherwise fastened to the side wall portions of the keepers to hold the same in mounted position, each keeper 27, as shown in Fig. 6, being preferably formed as an inverse image of the other, so that the same may be mounted on the side members 13 with the slots 31 of the keepers facing inwardly in the frame structure, and the openings 32 in registration transversely of the frame, the keepers being preferably disposed in position with the seat forming ends of the slots 31 extending away from the hinge remote frame member 14'.

The latching bolts 28, as shown in Fig. 6, may each comprise a relatively heavy gauge sheet metal stamping having a bar portion 41 adapted to be slidably mounted on the back closure panel 25, opposite a corresponding keeper 27. Each bolt may also embody an integral, outwardly extending latching tongue or finger 42 on and extending laterally of the bar portion 41 and normally and medially thereof in position to latchingly engage the seat 33 of the cooperating keeper 27.

A mounting bracket 43 for each of the bolts 28 may be provided for securing the same in latching position on the back closure panel 25. The brackets 43 may each comprise a sheet metal stamping having a medial portion 44 formed with a longitudinal slot or opening 45 and adapted to overlie the bar portion 41 of the corresponding bolt, each bracket 43 being provided with an integral offset flange 46 along one side thereof, and a pair of integral offset flanges 47 formed at the opposite ends of the bracket, on the side of the medial portion 44 remote from the flange 46.

The flanges 46 and 47 may be provided with openings 48 for the reception of fastening means, such as rivets, for securing the bracket on the panel 25 with the bar portion 47 slidably mounted beneath the medial bracket portion 44, and the latching tongue 42 projecting outwardly of the medial portion 44 between the flanges 47. Each bolt may be disposed selectively in latch releasing position presenting the tongue 42 in alinement with the opening 32, and in latching position presenting the tongue 42 in registration with the latching seat 33.

In order to retain the bolts 28 in snug non-rattling fashion in the brackets 43, the same may carry leaf springs 49 extending along the edge of the bar portion 41 remote from the latching tongue 42. Such leaf springs may have opposite bent ends 50 adapted for interfitting engagement in slots 51 formed in spaced relation in the edge of the bar portion 41 remote from the latching tongue 42. The spring 49 of each latching bolt, accordingly may press resiliently against the inner edge of the flange 46 where the same integrally connects with the medial bracket portion 44, to prevent the bolt 28 from rattling in the bracket, and also to frictionally hold the same in adjusted position.

The bar portion 41 may be provided medially with a spaced series of perforations 52, or may be otherwise formed opposite the bracket slot 45 to enable the same to be finger gripped through the opening 45 in shifting the bolt between latched and released position.

It will be seen from the foregoing that the bolts 28 of the latches may be manually shifted toward latch releasing position, in which the latching tongues 42 are disposed in registration with the latch receiving opening 32 of the keepers 27, such position being preferably attained by shifting the bolts 28 in the brackets 43 as far as possible in a direction toward the hinged edge of the panel 25. When in such position, the panel 25 may be swung on its hinge from open to closed position, and vice versa. As the panel is moved from open to closed position, the edges of the panel will resiliently engage the lip 29, the resilient resistance of the lip 19 to panel closing movement becoming substantial as the tongues 42 enter the slots 31 through the openings 32. It is, accordingly, necessary to exert appreciable pressure upon the hinge remote portions of the panel 25, as at the latch mounting brackets 43, in order to press the panel against the lip 19 sufficiently to allow the latching tongues 42 to clear the latching projection 34, thereby permitting the tongues to be moved past the projections 34 and into latching registration with the latching seats 33.

After the tongues 42 have been disposed in registration with the seats 33, release of manual pressure on the panel 25 will allow the inherent resilience of the sealing lips 19 to press the panel 25 in a direction to set the latching tongues resiliently upon the seats 33 behind the latching projections 34, so that the latches may not thereafter be moved to latch released position in registration with the openings 32 without first manually depressing the closure panel 25 against the contrary resilient arrangement of the sealing lips 19.

As shown more particularly in Fig. 7 of the drawings, the novel features and functions of the present invention may be embodied in latching structures in which the latching bolts are movable in directions normal to the keeper mounting frame members 13. In such modified construction the keepers 29 may omit the opening 32 and the latching projection 34, and need only be formed with a bolt receiving slot 31'. The bolts 28 may comprise a bar portion 41' formed at one end to provide a latching tongue 42' having an offset latching lug 34' at the terminal end of the latching tongue, said bar portion and tongue being longitudinally movable in the bracket 43 between a projected latching position in engagement with a latching seat 33' formed at one side of the slot 31' and a retracted released position outwardly of the keeper.

When the back closure panel 25 of a cassette, fitted with latches of the sort shown in Fig. 7, is moved toward closed position, the resilience of the sealing lips 19 will require pressure to be applied upon the closure member, in order to permit the flanged end of the latching tongue 42' to enter beneath the seat forming edges of the latching slots 31'. By depressing the panel 25 against the lips 19, however, the latching bolts 28' may be moved mutually outwardly to extend the tongues 42' through the slots 31', after which release of pressure on the panel 25 will permit the latching flanges 34' to lockingly interengage behind the slotted edges of the keepers which define the seats 33'. Accordingly, cassette latches of the sort shown in Fig. 7, as is also the case with cassette latches of the sort shown in Fig. 6, may be locked in latched position and unlocked for shifting movement toward latch releasing position, only by first depressing the closure panel 25 against the sealing lips 19.

It is thought that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the forms herein disclosed being a preferred embodiment for the purpose of illustrating the invention.

The invention is hereby claimed as follows:

In a cassette embodying a peripheral frame and a back cover panel movable on the frame to open and close the cassette, a latch for releasably securing the cover panel in said frame comprising a sheet metal channel forming a keeper secured on the frame with the bottom of the channel facing rearwardly on the frame, a bolt comprising an elongated bar portion of relatively flat configuration, and a bracket shiftably securing the bolt for longitudinal movement on the cover panel, in a direction parallel to the keeper, said bracket comprising a medial portion in position to overlie the elongated bar portion of the bolt on the cover panel and offset mounting portions disposed on opposite sides of said medial portion, in position to be secured on the cover panel, a said bracket mounting portion, on the side of the bracket facing the keeper, being cut away to define spaced mounting lugs and an intermediate opening therebetween, said bolt having a latching tongue formed on and extending laterally from and normally of said bar portion through said opening and into position for engagement with the keeper, said lugs and tongue cooperating to limit movement of the bolt on the cover panel between latching and unlatched positions with respect to the keeper, said keeper being formed with a receiving opening in the bottom and the inwardly facing side of the channel for receiving said latching tongue therethrough when the cover panel is moved from open to closed position on the frame, with the bolt in unlatched position with respect to the bracket, said keeper providing a latching opening in its inwardly facing side adjacent and connected with said receiving opening for latchingly receiving said tongue when said bolt is in latching position with respect to the bracket, and a finger formed on said keeper between said receiving and latching openings in position to engage a side edge of said tongue and aid in retaining said tongue against movement from latched position in said latching opening toward unlatched position in said receiving opening.

References Cited in the file of this patent

UNITED STATES PATENTS

| | | |
|---|---|---|
| 16,979 | Kellogg | Apr. 7, 1857 |
| 44,169 | Eddy | Sept. 13, 1864 |
| 412,094 | James | Oct. 1, 1889 |
| 1,234,416 | Sweigard | July 24, 1917 |
| 1,246,620 | Levy | Nov. 13, 1917 |
| 1,731,004 | Goethe | Oct. 8, 1929 |
| 1,908,388 | Watson | May 9, 1933 |
| 2,056,463 | Hunt | Oct. 6, 1936 |